United States Patent
Joye et al.

(10) Patent No.: US 10,693,323 B2
(45) Date of Patent: Jun. 23, 2020

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Klaas Jacob Lulofs, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 226 days.

(21) Appl. No.: 15/773,421

(22) PCT Filed: Nov. 1, 2016

(86) PCT No.: PCT/EP2016/076278
§ 371 (c)(1),
(2) Date: May 3, 2018

(87) PCT Pub. No.: WO2017/080865
PCT Pub. Date: May 18, 2017

(65) Prior Publication Data
US 2018/0323648 A1    Nov. 8, 2018

(30) Foreign Application Priority Data
Nov. 9, 2015   (EP) ..................................... 15193672

(51) Int. Cl.
*H02J 50/12* (2016.01)
*H02J 5/00* (2016.01)
(Continued)

(52) U.S. Cl.
CPC ............. *H02J 50/12* (2016.02); *H02J 5/005* (2013.01); *H02J 7/025* (2013.01); *H02J 50/80* (2016.02);
(Continued)

(58) Field of Classification Search
CPC .. H02J 50/12; H02J 7/025; H02J 5/005; H02J 50/80; H04B 5/0081; H04B 5/0037; H04B 5/0031
(Continued)

(56) References Cited

U.S. PATENT DOCUMENTS

2004/0130915 A1   7/2004  Baarman
2006/0113970 A1   6/2006  Stover et al.
(Continued)

FOREIGN PATENT DOCUMENTS

WO   2014083015 A1   6/2014

OTHER PUBLICATIONS

Qi Specification, Wireless Power Consortium, https://www.wirelesspowerconsortium.com/index.html, Accessed May 3, 2018.

*Primary Examiner* — Rexford N Barnie
*Assistant Examiner* — Thai H Tran

(57) ABSTRACT

A power transmitter (101) inductively transferring power to a power receiver (105) comprises a resonance circuit (201) comprising a transmitter coil (103). A driver (203) generates a drive signal for the resonance circuit (201) and a data receiver (513) receives messages load modulated onto a power transfer signal by the power receiver (105) during communication time intervals. An error unit (507) determines a coil current error and a control loop (511) controls the current through the transmitter coil (103) in response to the coil current error with the control loop (511) being active during the communication time intervals. A loop response of the control loop is attenuated for coil current errors in a reduced control range relative to coil current error indications outside the reduced control range, where the reduced control range includes a zero coil current error.

15 Claims, 11 Drawing Sheets

(51) Int. Cl.
 *H02J 50/80* (2016.01)
 *H02J 7/02* (2016.01)
 *H04B 5/00* (2006.01)

(52) U.S. Cl.
 CPC ......... *H04B 5/0031* (2013.01); *H04B 5/0037* (2013.01); *H04B 5/0081* (2013.01)

(58) Field of Classification Search
 USPC .......................................... 307/104; 320/108
 See application file for complete search history.

(56) References Cited

U.S. PATENT DOCUMENTS

| | | | | |
|---|---|---|---|---|
| 2006/0246846 A1* | 11/2006 | Ginggen | ............ | G06K 19/0701 455/69 |
| 2007/0216392 A1* | 9/2007 | Stevens | ................... | H02J 50/40 323/355 |
| 2010/0083012 A1* | 4/2010 | Corbridge | ............. | G06F 1/1632 713/300 |

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2016/076278 filed on 1 Nov. 2016, which claims the benefit of European Patent Application No. 15193672.1, filed on 9 Nov. 2015. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Many wireless power transmission systems, such as e.g. Qi, supports communication from the power receiver to the power transmitter thereby enabling the power receiver to provide information to the power transmitter that may allow this to adapt to the specific power receiver or the specific conditions experienced by the power receiver.

In many systems, such communication is by load modulation of the power transfer signal. Specifically, the communication is achieved by the power receiver performing load modulation wherein a load applied to the secondary receiver coil by the power receiver is varied to provide a modulation of the power signal. The resulting changes in the electrical characteristics (e.g. variations in the current of the transmitter coil) can be detected and decoded (demodulated) by the power transmitter.

Thus, at the physical layer, the communication channel from power receiver to the power transmitter uses the power signal as a data carrier. The power receiver modulates a load which can be detected by a change in the amplitude and/or phase of the transmitter coil current or voltage.

More information of the application of load modulation in Qi can e.g. be found in chapter 6 of part 1 of the Qi wireless power specification (version 1.0).

Wireless power transmitters constructed according to the Qi v1.1 specification operate in the so-called inductive regime. In this mode, power transfer occurs at tight coupling (coupling factor typically above 0.3) with relatively high efficiency. If a larger distance ("Z-distance") or more positioning freedom of the receiver is desired, power transfer typically occurs in the so-called resonant regime or mode with loose coupling (coupling factor typically below 0.3). In the resonant mode, the resonance frequencies of power transfer resonance circuits at the power transmitter and at the power receiver should match to achieve the maximum efficiency. Furthermore, it is often desirable for the drive frequency and the transmitter resonance frequency to be the same as this may reduce intermodulation effects between these.

An example of a wireless power transfer system using load modulation communication techniques is provided in WO2014/083015A1.

In many power transfer approaches, such as the Qi Specification, the power transmitter is arranged to adjust the current through the power transmitter coil in response to control data that it receives from the power receiver. Thus, the current is increased if the power receiver requests more power and is reduced if less power is requested.

In order to provide suitable dynamic characteristics, the control is typically implemented by an outer loop involving the messages from the power receiver. This outer loop sets a reference current level for the transmit coil current in response to the messages from the power receiver. The power transmitter then implements an inner loop which controls the measured current through the transmitter coil to match the reference current set by the outer loop.

The current is specifically adjusted by controlling one or more of: the operating frequency of the power signal (the drive frequency of the drive signal to the resonance circuit of the power transmitter), the rail voltage of the driver stage of the transmitter (and thus the voltage amplitude of the drive signal), and the duty cycle of the power signal/drive signal.

However, there is inherently a contradiction between the desire to keep the transmit coil current constant in order to control the power transfer and the use of load modulation. Indeed, the purpose of the current loop can be considered to be to keep the transmit coil current constant when load variations occur whereas load modulation is based on detecting transmit coil current variations caused by load variations. In systems, such as Qi, this conflict is resolved by applying a time division approach. Specifically, the control loop is only active for a short period of time with the rest of the time being available for communication by load modulation. Specifically, the control loop is only active for approximately 10 msec after each message is received from the power receiver, which is typically with an interval of 250 msec.

However, such an approach may be suboptimal in some scenarios. In particular, the time division may result in suboptimal and potentially slow power transfer control. This may in some scenarios result in an inappropriate power setting which could result in suboptimal or unacceptable performance of the wireless power transfer system. It may also complicate communication as this is restricted to times during which the power control is not active.

An improved power transfer approach would accordingly be advantageous. In particular, an approach that allows improved operation, improved power transfer, increased flexibility, facilitated implementation, facilitated operation, improved communication, improved power control, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for inductively transferring power to a power receiver, the power transmitter comprising: a resonance circuit comprising a transmitter coil for generating a power transfer signal for wirelessly transferring power to the power receiver; a driver generating a drive signal for the resonance circuit, the drive signal having a drive frequency; an error unit arranged to determine a coil current error indication being indicative of a difference between a measured current for the transmitter coil and a target current for the transmitter coil; a receiver for receiving messages load modulated onto the power transfer signal by the power receiver during communication time intervals; and a control loop arranged to control the current through the transmitter coil in response to the coil current error indication, the control loop being arranged to be active during communication time intervals; and wherein, at least during communication time intervals, a loop response of the control loop is attenuated for coil current error indications in a reduced control range relative to coil current error indications outside the reduced control range, the reduced control range comprising a coil current error indication value corresponding to zero coil current error.

The invention may provide improved performance in many wireless power transfer systems. It may provide an improved trade-off and co-existence/co-operation of power control and load modulation communication. Specifically, it may in many embodiments enable or improve simultaneous active power control and load modulation communication. This may lead to improved communication and/or improved power control.

The invention may in particular in many embodiments allow an improved reaction and reduced overall sensitivity to fast load variations of the power receiver. The reaction time of the power control may be substantially improved, and a more stable control can typically be achieved. This may be achieved while still allowing or even improving communication using load modulation.

The invention may in particular allow improved performance for a wireless power transfer system operating in the resonant mode. Indeed, the Inventors have realized that whereas conventional time divided power control and load modulation may typically result in acceptable performance for systems operating in the inductive regime/mode, it may in many scenarios be problematic for systems operating in the resonance mode. In particular, the Inventors have realized that for systems in the resonance mode, fast and large changes in the coil current may occur and that this may potentially result in faulty operation or potentially even malfunction of the power receiver.

Such problems and issues may in the describe approach often be mitigated by the application of a modified loop control that allows a power control loop for controlling a transmit coil current to be active simultaneously with communication by load modulation. Thus, rather than performing either communication or power control (i.e. rather than dividing these in time), the described approach may facilitate or enable both to co-exist simultaneously. In particular, the invention may provide for an approach where the control loop in many embodiments allows the existence of smaller variations of the coil current which can be used to demodulate load modulation while being able to quickly and efficiently adapt to and compensate larger and/or faster load changes.

Thus, in the approach the control loop may be active during communication time intervals in which messages may be received from the power receiver, i.e. the power transmitter may operate the control loop and receive load modulation messages at the same time. When active, the control loop is arranged to modify control/change the current through the transmitter coil for at least some values of the coil current error indication.

The attenuation of the loop response may specifically be an attenuation of a feedback strength, a loop sensitivity and/or a loop response strength.

In particular, the loop response may be attenuated by a feedback/loop gain and/or an update rate of the loop being reduced for a coil current error indication being in the reduced control range relative to when the coil current error indication is not within the reduced control range. The reduced control range may be symmetric round a zero coil current error but need not be so.

A communication time interval may be a time interval in which the power transmitter is arranged to be able to receive load modulation messages from the power receiver. In some scenarios, the communication time intervals may be time intervals in which the power receiver is actually transmitting messages. In some scenarios, the power receiver may however not transmit any message in a communication time interval. For example, the power transmitter may adapt to be able to receive communication in periodically repeating communication time intervals but only some of these may be used by the power receiver to actually transmit messages. The communication time intervals may be longer than the message duration for messages from the power receiver.

Indeed, in some embodiments the communication time intervals may be from one message to the next, i.e. the power transmitter may be arranged to continuously be in a communication time interval. In such embodiments, the control loop may be able to always use the attenuated loop response, i.e. the loop response may always be attenuated for values of the coil current error indication within the reduced control range relative to values outside of the interval.

The control loop may be part of a nested loop and may specifically be an inner control loop within an outer control loop which sets the target current for the transmitter coil.

The coil current error indication may specifically be a coil current error or a monotonically increasing function of a coil current. The coil current error indication may specifically be a monotonically increasing function of the difference between a monotonically increasing function of the measured current for the transmitter coil and monotonically increasing function of the target current for the transmitter coil.

In accordance with an optional feature of the invention, at least one of a loop gain and an update rate of the control loop is substantially zero for coil current error indications in the reduced control range.

This may provide particularly advantageous operations and/or implementation in many embodiments. In particular, it may improve demodulation performance by the control loop not introducing attenuation to the current variations due to load modulation. It may further in many embodiments allow a low complexity implementation.

In accordance with an optional feature of the invention, the power transmitter comprises an adapter arranged control the control loop to have a stronger loop response outside of the communication time intervals than during communication time intervals, a symmetric loop response providing the same absolute loop response for coil current errors with the same absolute value and opposite signs, and an asymmetric loop response for at least some coil current errors providing different absolute loop responses for coil current errors with the same absolute value and opposite signs.

This may provide improved performance and may in particular in many scenarios provide improved power control while allowing efficient load modulation communication. The approach may specifically allow improved power control during non-communication time intervals which may e.g. allow full optimization of the coil current. During communication time intervals, a weaker control (e.g. slower and/or allowing higher error levels) may be applied which may provide a less optimized power control but may allow communication performance.

In accordance with an optional feature of the invention, the adapter is arranged to apply at least one of a higher loop gain and a higher loop update rate for at least some values of the coil current error indication outside of the communication time intervals than during communication time intervals.

This may provide improved performance and may in particular in many scenarios provide improved power control while allowing efficient load modulation communication.

In accordance with an optional feature of the invention, the power transmitter of further comprises a communication timer arranged to determine a start of a communication time interval in response to the receiver detecting a predetermined preamble pattern for a message from the power receiver.

This may provide a particularly efficient approach. For example, in many embodiments, the preamble may be an extended pattern which with sufficiently high probability can be detected when the stronger loop response is applied (as opposed to the detection of individual bit values). Thus, the power control may be optimized until it is detected that the power receiver is actually transmitting a message. If this is detected, by detecting the preamble, the power transmitter may switch to the weaker control response having an attenuated loop response for coil current error indication within the reduced control range. Thus, during the communication time intervals, the power transmitter can demodulate individual bits while at the same time allowing the power control to be active, e.g. in order to react to large load variations.

In accordance with an optional feature of the invention, the power transmitter further comprises a communication timer arranged to determine at least some communication time intervals as periodically repeating time intervals.

This may provide a particularly efficient approach in many embodiments.

In accordance with an optional feature of the invention, the adapter is arranged to decrease a size of the reduced control range outside of the communication time intervals.

This may improve control performance outside of the communication time intervals, and may specifically reduce the coil current error that is allowed to be present. In particular, the reduced control range may be reduced to zero when outside the communication time intervals.

In accordance with an optional feature of the invention, the adapter is arranged to control the control loop to employ an asymmetric loop response during communication time intervals and a symmetric loop response outside of the communication time intervals.

This may provide improved performance in many scenarios and may in particular provide improved load modulation by reducing the impact of the power control while e.g. ensuring that some power control is still present to address scenarios resulting in the power of the power transfer being too high.

The loop response may thus be asymmetric with respect to the coil current error (indication) when in the communication time intervals but symmetric outside the communication time intervals. Specifically, the adapter may be arranged to switch to a loop response that is asymmetric with respect to the coil current error indication during communication time intervals.

In accordance with an optional feature of the invention, the asymmetric response is arranged to not allow an increase of the current through the transmitter coil.

This may provide improved performance in many scenarios and may in particular provide improved load modulation by reducing the impact of power control while ensuring that power control is still present to address scenarios resulting in the power of the power transfer being too high.

The asymmetric response may be arranged to change the at least one of the duty cycle and the voltage amplitude in response to coil current error indications only for coil current error indications indicative of a coil current above a target value.

In accordance with an optional feature of the invention, at least one of an absolute feedback gain and an update rate of the control loop is a monotonically increasing function of an absolute value of the coil current error indication.

This may provide improved performance and especially power control. It may allow an improved compensation for higher variations while allowing smaller load variations to be less compensated thereby facilitating detection of load modulation resulting in such variations.

In some embodiments, the at least one of the absolute feedback gain and the update rate of the control loop may be a monotonically increasing function of the absolute coil current error indication during only communication time intervals. However, in many embodiments, the at least one of the feedback gain and the update rate of the control loop may be a monotonically increasing function of the coil current error indication during both communication time intervals and outside of the communication time intervals.

In accordance with an optional feature of the invention, the control loop is arranged to support a plurality of modes having different loop responses, the modes including a reduced control mode in which the loop response is attenuated with respect to the loop response for other modes, and further comprising an adapter arranged to switch the control loop between the modes in response to the coil current error indication, the adapter being arranged to switch to the reduced mode in response to a determination that the coil current error indication is within the reduced control range.

This may provide a particularly efficient operation and/or implementation.

In accordance with an optional feature of the invention, the control loop is arranged to determine the target current in response to power control messages received from the power receiver.

This may allow an efficient nested power control using e.g. a slower outer loop with feedback being provided by the power receiver while a faster inner loop implemented in the power transmitter may allow a fast adaptation to e.g. load changes.

In accordance with an optional feature of the invention, the control loop is arranged to control the current by controlling at least one of a duty cycle, a drive frequency and a voltage amplitude of the drive signal.

This may provide particularly attractive performance and may in particular allow an implementation supporting wireless power transfer in the resonant mode, and in particular operation in a resonant mode wherein the drive frequency is linked/locked to the resonance frequency of the power transfer resonance circuit of the power transmitter and/or the power receiver.

According to an aspect of the invention there is provided a wireless power transfer system comprising power transmitter and a power receiver; wherein the power transmitter comprises: a resonance circuit comprising a transmitter coil for generating a power transfer signal for wirelessly transferring power to the power receiver; a driver generating a drive signal for the resonance circuit, the drive signal having a drive frequency; an error unit arranged to determine a coil current error indication being indicative of a difference between a measured current for the transmitter coil and a target current for the transmitter coil; a receiver for receiving messages load modulated onto the power transfer signal by the power receiver during communication time intervals; and a control loop arranged to control the current through the transmitter coil in response to the coil current error indication, the control loop being arranged to be active during communication time intervals; and wherein, at least during communication time intervals, a loop response of the control loop is attenuated for coil current error indications in a reduced control range relative to coil current error indications outside the reduced control range, the reduced control range comprising a coil current error indication value corresponding to zero coil current error.

According to an aspect of the invention there is provided a method of operation for a power transmitter inductively transferring power to a power receiver, the power transmitter comprising a resonance circuit comprising a comprising a transmitter coil for generating a power transfer signal for wirelessly transferring power to the power receiver; the method comprising: generating a drive signal for the resonance circuit, the drive signal having a drive frequency; determining a coil current error indication being indicative of a difference between a measured current for the transmitter coil and a target current for the transmitter coil; receiving messages load modulated onto the power transfer signal by the power receiver during communication time intervals; and a control loop controlling the current through the transmitter coil in response to the coil current error indication, the control loop being active during communication time intervals; wherein, at least during communication time intervals, a loop response of the control loop is attenuated for coil current error indications in a reduced control range relative to coil current error indications outside the reduced control range, the reduced control range comprising a coil current error indication value corresponding to zero coil current error.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
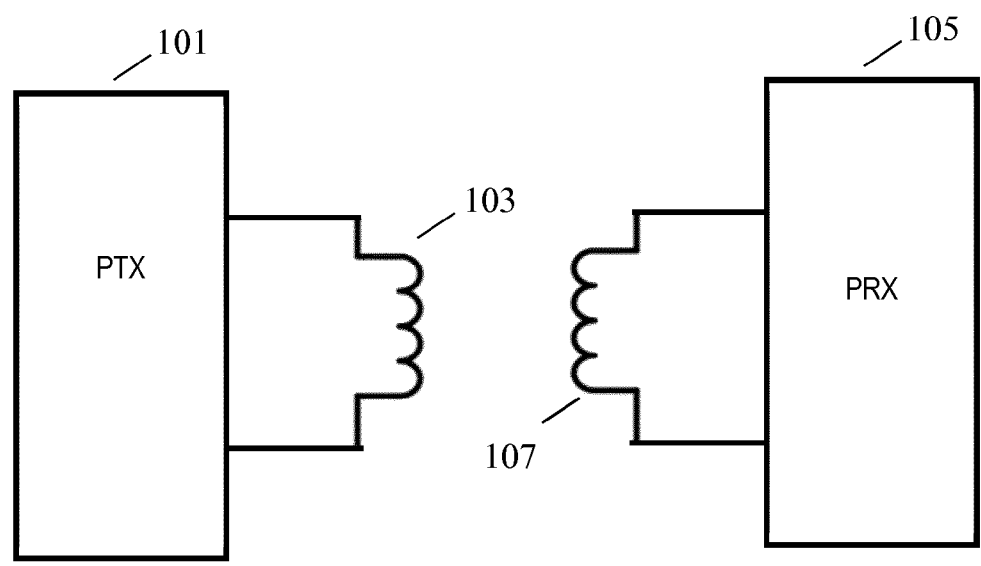
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the receiver 105. Specifically, the power transmitter 101 generates a wireless inductive power transfer signal (also referred to as a power transfer signal, power transfer signal or an inductive power transfer signal), which is propagated as a magnetic flux by the transmitter coil 103. The power transfer signal may typically have a frequency between around 70 kHz to around 150 kHz, and often for Qi compatible systems typically in the range from 95 kHz to 115 kHz. The transmitter coil 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal/magnetic field between the transmitter coil 103 and the receiver coil 107 (the magnetic flux signal), but it will be appreciated that by equivalence it may also be considered and used as a reference to an electrical signal provided to the transmitter coil 103 or picked up by the receiver coil 107.

The system is arranged to transfer substantial power levels, and specifically the power transmitter may support power levels in excess of 500 mW, 1 W, 5 W, or 50 W in many embodiments. For example, for Qi corresponding applications, the power transfers may typically be in the 1-5 W power range for low power applications, and in excess of 100 W and up to more than 1000 W for high power applications, such as e.g. kitchen applications.

Figure 2:
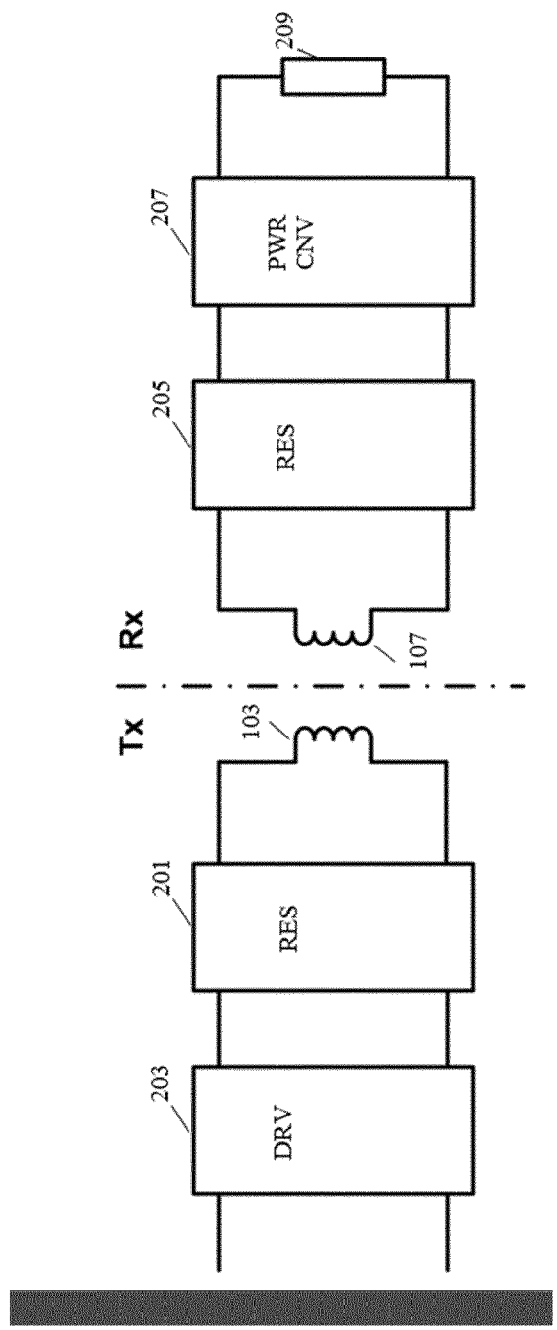
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201, which includes the transmitter coil 103 (in FIG. 2, the transmitter coil 103 is for clarity shown external to the resonance circuit 201 but is considered to be part of this). The resonance circuit 201 of the power transmitter 101 will also be referred to as the transmitter resonance circuit 201. The resonance circuit 201 may typically be a serial or parallel resonance circuit, and may in particular consist of a resonance capacitor coupled in parallel (or in series) to the transmitter coil 103. The power transfer signal is generated by driving the output resonance circuit from a driver 203 generating a drive signal with a suitable drive frequency (typically in the 20-200 kHz frequency range).

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 of the power receiver 105 will also be referred to as the receiver resonance circuit 205 or the receiver resonance circuit. The receiver resonance circuit 205 may typically be a serial or parallel resonance circuit, and may in particular consist of a resonance capacitor coupled in parallel (or series) to the receiver inductor 107.

The receiver resonance circuit 205 is coupled to a power converter 207 which converts the received power transfer signal, i.e. the induced signal provided by the receiver resonance circuit 205, into a power that is provided to an external load 209 (typically by performing AC/DC conversion as will be well known to the skilled person).

The load may for example be a battery and the power provision may be in order to charge the battery. As another example, the load may be a separate device and the power provision may be in order to power this device.

In the system, the resonance circuit 201 of the transmitter resonance circuit 201 is not a fixed resonance circuit but rather is a variable resonance circuit that is controlled to follow the drive frequency. Specifically, an approach may be used for adapting the effective resonance frequency of the resonance circuit 201. In the approach, the dynamic state changes for at least one of the (resonating) components of the resonance circuit 201 are temporarily slowed (including potentially being completely stopped) for a fraction of the cycle.

The driver 203 of FIG. 2 generates a varying (and typically AC) voltage drive signal which is applied to the resonance circuit (and thus to the resonance capacitor (not shown in FIG. 2) and transmitter coil 103). In some embodiments, the transmitter resonance circuit 201 may be a series resonance circuit, and the voltage drive signal may be applied across the capacitor and inductor. In some embodiments, the driver 203 may be coupled directly (or indirectly) to the transmit coil 103 and the voltage drive signal may be provided to the transmit coil 103.

Thus, in the system, the driver 203 generates a drive signal which is fed to the transmitter resonance circuit 201/transmit coil 103, causing the transmit coil 103 to generate the power transfer signal providing power to the power receiver 105. The drive signal is generated to have a given frequency referred to as the drive frequency, i.e. the drive frequency is the frequency of the drive signal.

Figure 3:
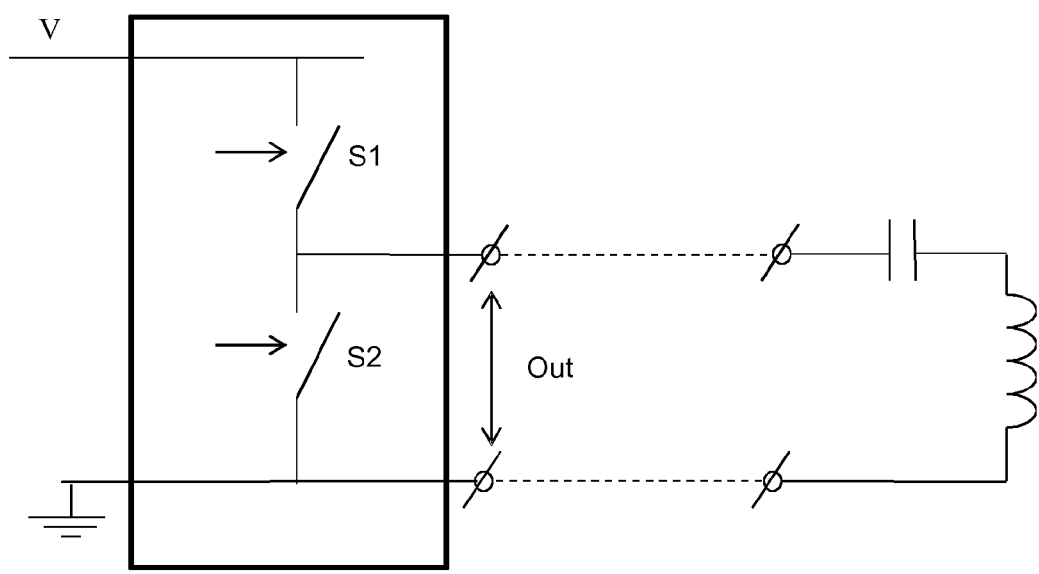
FIG. 3 illustrates an example of elements of a half-bridge inverter for a power transmitter in accordance with some embodiments of the invention.
Figure 4:
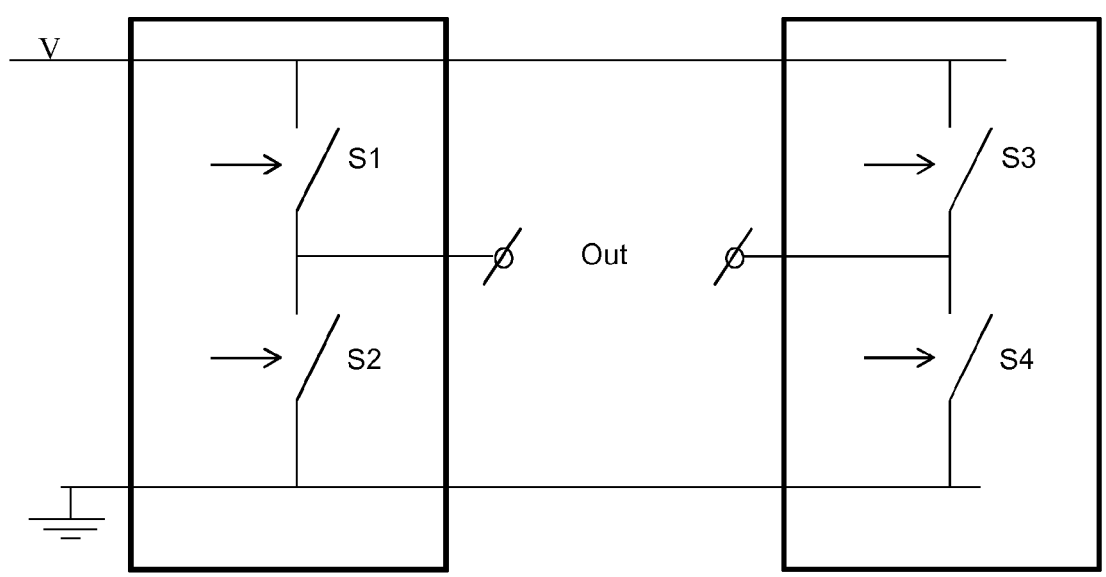
FIG. 4 illustrates an example of elements of a full-bridge inverter for a power transmitter in accordance with some embodiments of the invention.

The driver 203 generates the current and voltage which is fed to the transmitter coil 103. The driver 203 is typically a drive circuit in the form of an inverter which generates an alternating signal from a DC Voltage. The output of the driver 203 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter coil via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The above description corresponds to the case where the left and right bridge are 180° out of phase and provide the maximum output power or maximum duty cycle. However, in other scenarios, the bridge halves may be partial out of phase resulting in both S2 and S4 or S1 and S3 being closed simultaneously. In this state, the bridge voltage will be zero and thus the approach may be used to reduce the output power or duty cycle from the maximum values.

The driver 203 accordingly generates a drive signal with a given drive frequency and applies this signal to the transmitter resonance circuit 201. The transmitter resonance circuit 201 is formed by an inductive impedance and a capacitive impedance.

Figure 5:
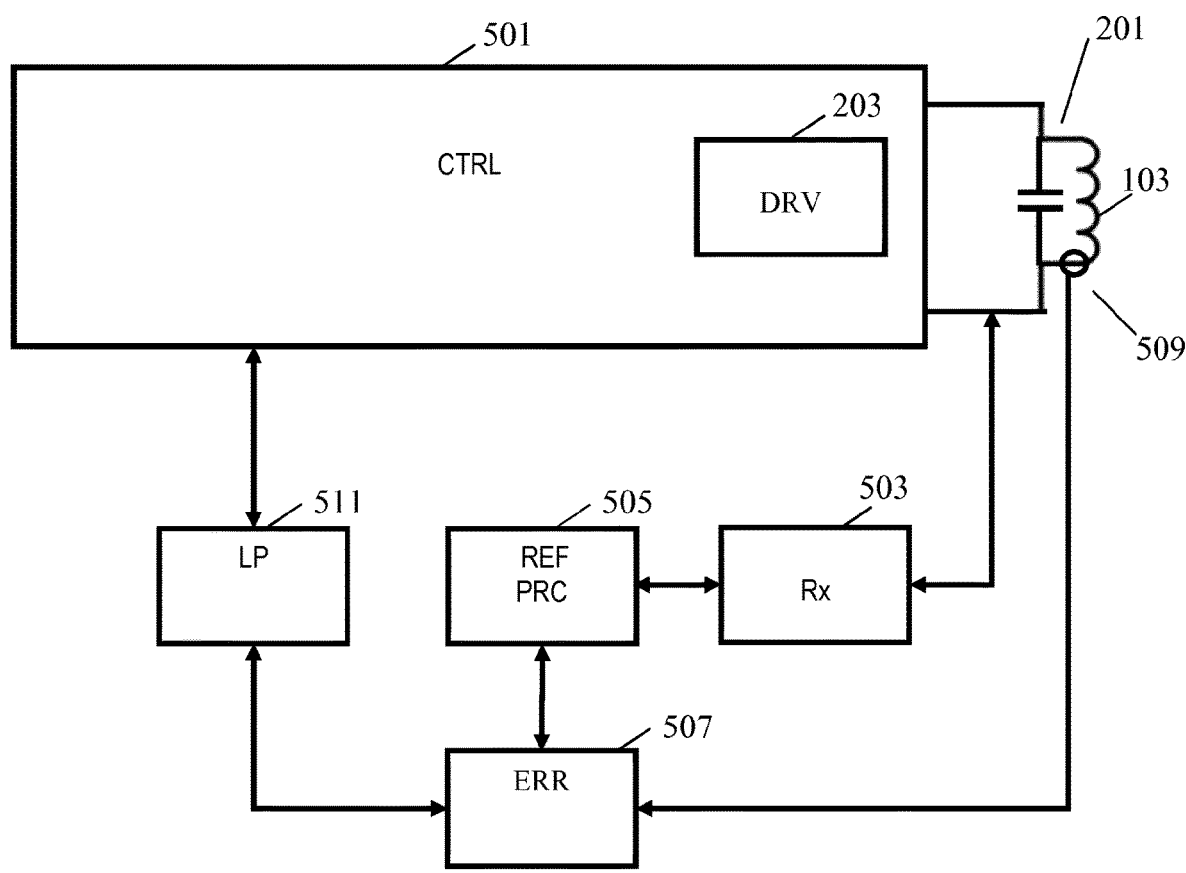
FIG. 5 illustrates an example of elements of a power transmitter in accordance with some embodiments of the invention.

FIG. 5 illustrates elements of the power transmitter 101 in more detail. In the example, the power transmitter 101 comprises a power transfer controller 501 which includes functionality for performing and controlling a power transfer to the power receiver 105 as will be known to the skilled person. The power transfer controller 501 may specifically comprise required or desired functionality for operating a power transfer in accordance with the Qi Specification except from the herein described differences and variations.

The power transfer controller 501 is specifically coupled to the transmitter resonance circuit 201 and comprises the driver 203.

In the described power transfer system, the power receiver 105 is arranged to communicate with the power transmitter 101 using load modulation. Accordingly, the power transmitter 101 comprises a load modulation receiver in the form of a demodulator 503 which is arranged to receive data messages from the power receiver 105. Specifically, the demodulator 503 is arranged to demodulate load modulation of the power transfer signal to determine the corresponding data transmitted from the power receiver 105. The load modulation receiver/demodulator 503 is thus arranged to demodulate load modulation of the power transfer signal by the power receiver.

On the physical level, the communication channel from the power receiver 105 to the power transmitter 101 is implemented by using the wireless power transfer signal as a communication carrier. The power receiver 105 transmits data messages by modulating the load of the receiver coil 107.

In the arrangement of FIG. 1, the power receiver 105 load modulates the wireless power transfer signal. The power receiver 105 may for example do this by connecting and disconnecting a capacitor coupled in parallel to the receive coil 107 thereby changing the resonance, and thus load characteristics of the power receiver 105. These changes result in corresponding variations in the power signal at the power transmitter side, and specifically in variation in the current and voltage of the transmitter coil 103. These changes are directly or indirectly detected by the power transmitter 101 and used to demodulate the load modulation data from the power receiver 105.

The load modulation may e.g. be detected by a change in the amplitude and/or phase of the drive signal current/voltage, by a change in the current/voltage of the transmitter coil 103, and/or a change of current/voltage of a resonance circuit. As another example, the load modulation may be detected by a change in the current of the power supply to the driver 203 (specifically to the inverter/switch bridge).

The power receiver 105 can accordingly load modulate data onto the power signal which the power transmitter 101 can then demodulate. The approach may for example correspond to that described for Qi in "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The load modulation is specifically used to adapt the power transfer, and in particular to implement a power control loop that continuously adapts the transmitted power level based on power control messages received from the power receiver 105. The power control messages are accordingly communicated by load modulation.

As mentioned, in the system, the demodulator 503 is arranged to demodulate the load modulation by detecting amplitude and/or phase variations of the current through the transmitter coil 103 and/or the voltage over the transmit coil 103. Accordingly, the demodulator 503 is coupled to the primary resonance circuit 201 and is arranged to measure at least one of the coil current through the transmitter coil 103 and the inductor voltage across the transmitter coil 103.

In some embodiments, coil current and/or voltage may be determined indirectly, such as e.g. by measuring the supply current variations to the inverter of the driver 203, or by measuring a current or voltage of a resonance capacitor etc. However, in the specific example, the coil current/voltage is determined by directly sensing the coil current or voltage.

As mentioned, the wireless power transfer system also operates a nested power control loop. An outer loop receives power control message from the power receiver 105 and proceeds to increase or decrease the power of the power transfer signal accordingly.

In the example of FIG. 5, the demodulator 503 is coupled to a target processor 505 which is arranged to set a reference value for an inner control loop which controls the current through the transmitter coil 103 (henceforth for brevity referred to as the coil current). Specifically, the target processor 505 is fed the power control messages from power receiver and sets the reference or target current accordingly. In particular, the target processor 505 may be arranged to increase the target current when a power control message requesting increased power is received and to decrease the target current when a power control message is received requesting the power to be reduced.

The target processor 505 is coupled to an error unit 507 which is arranged to determine a coil current error indication which is indicative of the difference between a measured current for the transmitter coil and the target current for the transmitter coil.

Specifically the error unit 507 comprises an input for receiving a measurement value from a suitable sensor 509. It will be appreciated that different approaches for determining the current through an inductor or coil are known and that any suitable approach may be used. For example, in many embodiments, an inductive current sensor positioned adjacent the transmitter coil 103 may be used.

The error unit 507 thus receives a current measurement input and a target current and from this it may determine an error indication which reflects the error between the desired value (the target current) and the current value (the measured current) of the current through the transmitter coil 103. Thus, a coil current error indication is generated which is indicative of a difference between the measured current and the target current.

It will be appreciated that any suitable measure for the difference may be used and indeed that the specific measure used may depend on the specific preferences and requirements of the individual embodiment.

In many embodiments, the inductor current error indication may be determined as a monotonically increasing function of a difference between a monotonically increasing function of the target value and monotonically increasing function of the measured current value.

The following description will focus on embodiments where the coil current error indication is directly determined as the difference between the current measured value and the target value, i.e. as:

$$\Delta I = I_m - I_{target}$$

where $I_m$ is the measured value and $I_{target}$ is the target value.

It will be appreciated that the values received and processed by the error unit 507 may not necessarily be direct values representing the current as e.g. a measure of amperes but that it may be any values reflecting the corresponding currents. It will also be appreciated that the determination of the coil current error indication and the comparison of the values may compensate for potential differences in the relations between the respective values considered and the corresponding currents.

The error unit 507 is coupled to a loop response processor 511 which may set a characteristic of the (inner) current control loop, such as for example a gain function, an update rate, a filter characteristic etc. The loop response processor 511 is coupled to the power transfer controller 501 and may provide a signal which may control the coil current via the functionality of the power transfer controller 501.

In some embodiments, the coil current may directly be controlled by the driver 203 comprising a current controller which adjusts the operation to result in a given coil current as controlled by the output from the loop response processor 511.

However, in many embodiments, the coil current may be controlled by controlling at least one of the duty cycle and the voltage amplitude for the drive signal. Thus, the (average) coil current may be increased by increasing the duty cycle of the drive signal (and specifically by increasing the on-times of the bridge switches of the driver) and/or by increasing the voltage amplitude of the drive signal (typically by increasing the rail voltage for the switch bridge of the driver 203). Conversely, the coil current may be reduced by reducing the corresponding parameters.

It will be appreciated that the control loop may comprise an integration function, and that this may e.g. be included in the loop response processor 511 or in the controller 501 itself (e.g. by the duty cycle being altered by a relative value that depends on the inductor current error indication). Thus, a coil current error indication indicating that the measured current is higher than the target current may result in the reduction of the current value of e.g. the duty cycle or the voltage amplitude (or indeed the drive frequency when this is not locked to the resonance frequency (i.e. typically when operating in the inductive regime) whereas a coil current error indication indicating that the measured current is lower than the target current may result in the increase of the current value of e.g. the duty cycle or the voltage amplitude (or the drive frequency).

The power transmitter 101 thus includes a control loop which controls the current through the transmitter coil 103 in response to the coil current error indication. Specifically, the control loop may control at least one of a duty cycle and a voltage amplitude of the drive signal in response to the coil current error indication.

Figure 6:
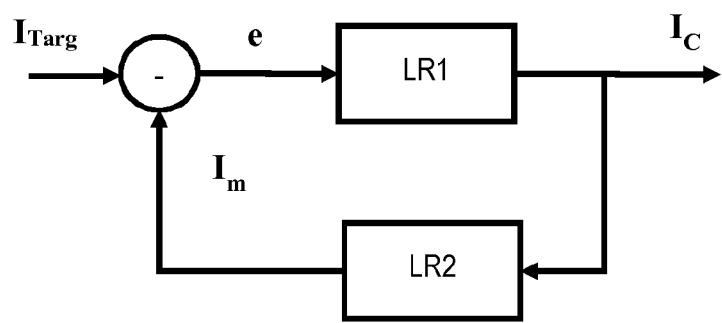
FIG. 6 illustrates an example of elements of an inner power control loop for a power transmitter in accordance with some embodiments of the invention.

The control loop may for example be represented by the equivalent schematic of FIG. 6. It is noted that the general theory, analysis and principles of control loops will be well known to the skilled person, and for brevity the following description will focus on the novel and inventive concepts of the operation of the specific control loop of the power transmitter 101.

In the equivalent diagram of FIG. 6, the coil current error e is determined as the difference between a target value reflecting a current target current and a feedback value indicative of the current coil current. The change of the coil current as a function of this coil current error e is represented by a first partial loop response LR1. This first partial loop response may thus include the processing of the loop response processor 511, the effect of the driver, the relationship between the parameter being changed (e.g. duty cycle or amplitude voltage) etc. The relationship between the current coil current and the feedback value used to determine the coil current is represented by a second partial loop response LR2. Thus, the second partial loop response LR2 may represent the response of the measurement sensor, A/D conversion etc.

The overall loop response may be the open loop response from the coil current error e to the (feedback value) for the measured current, $I_m$, i.e. the (open) loop response is the combined effect of the first partial loop response LR1 and the second partial loop response LR2. Hence, if the frequency response of the first partial loop response LR1 is represented by $G_1(f)$ and the frequency response of the second partial loop response LR2 is represented by $G_2(f)$, then the loop response is given by:

$$G(f) = G_1(f) \cdot G_2(f).$$

It will be appreciated that different measures of current may be used in different embodiments. For example, in many embodiments, the measured current may be determined as the average or RMS current for a suitable time interval. However, in the described examples, the measured current is a peak current for the coil current. This may be particularly advantageous since the peak current in most implementations can be directly measured without requiring additional signal processing.

In the described example, the control loop is arranged to control the coil current by controlling at least one of a duty cycle and a voltage amplitude of the drive signal. This may allow the coil current to be effectively controlled while still allowing the power transfer to operate in the resonance mode. Indeed, when operating in the resonance mode, the drive frequency is typically controlled to be the same as the resonance frequency of the transmitter resonance circuit in order to mitigate or eliminate intermodulation errors for the load modulation. Therefore, it is typically not feasible to control the coil current by controlling the drive frequency. Also, directly controlling the coil current is typically impractical as it tends to require complex functionality which is not directly compatible with the driving of the resonance circuit using an inverter with a bridge switch. Also, in many implementations, such as embodiments where the resonance frequency of the transmitter resonance circuit is controlled by slowing a state change of a capacitor or inductor of the resonance circuit, the direct control of the coil current would result in conflict.

In order to achieve efficient performance it is important to provide a high performance load modulation communication from the power receiver 105 to the power transmitter 101, and specifically it is important that a low error rate is achieved. However, in conventional power transfer systems, the communication tends to be suboptimal in some scenarios leading to increased communication errors and suboptimal power transfer performance.

In particular, there is inherently a conflict between the desire to operate a control loop seeking to compensate for load variations and the desire to communicate by detecting changes resulting from variations in loads. In particular, for systems such as Qi, the inner loop tends to be fast whereas communication is relatively slow in comparison (specifically the bit durations are relatively long in comparison to the response of the inner control loop). Therefore, typically, a load variation corresponding to the load modulation for a single bit will tend to be compensated much faster than the duration bit and accordingly the detection of the effect of the load variation will be difficult.

Traditionally, this conflict is in systems such as Qi addressed by the inner power loop only operating for relatively short periods of time with the intervening time intervals being available for communication. Specifically, when a new power control message is received from the power receiver, the target current may be updated and the inner power control loop may be activated for a period of typically around 10 msecs. This will result in the coil current being adapted to the new target value. The inner power control is then deactivated thereby allowing any load variations to be detected by detecting changes in the coil current. Typically, the inner power control loop may be active for around 10 msecs and with a typical interval between messages of up to 250 msec, this will result in load communication modulation being available in time intervals having a duration up to 240 msec. Thus, for such systems the power receiver is for the majority of the time in a state where load modulation can be detected. However, these periods are interrupted by relatively short periods in which the inner control loop is active and controls the coil current.

Such an approach has been found to work well in many scenarios. In particular, it has been found to be efficient for many power transfer systems when operating in the inductive regime. However, the Inventors have realized that the approach may result in disadvantageous and even potentially unacceptable performance in some scenarios and applications. In particular, the Inventors have realized that the approach may be suboptimal, and in some scenarios potentially unsuitable, especially for wireless power transfer operating in the resonant regime.

In the resonant regime, the power transfer system typically controls the power transmitter to operate with the resonance frequency of the transmitter resonance circuit and the drive frequency to be the same. Further, the frequencies may typically be adapted to be the same as, or at least close to, the resonance frequency of the power receiver 105. The adaptation may for example be achieved by using a tunable resonance circuit which can be adapted until the coil current is maximized for a given power receiver, with the drive frequency being adapted to be the same as the resonance frequency. In some approaches, the adaptation of the resonance frequency may be performed by e.g. short circuiting the capacitor of the transmitter resonance circuit for part of each cycle. Examples of approaches that adapt the drive frequency and transmitter resonance frequency to the resonance frequency of the power receiver may e.g. be found in US2004/0130915A1 or US 2006/0113970A1.

Thus, in many systems where an increased distance between the coils of the power transmitter and power receiver are desired (e.g. to provide more freedom in the positioning), the power transfer occurs in the resonant regime at loose coupling and with the resonance frequencies of the power transmitter and the power receiver matching in order to achieve maximum efficiency. However, the Inventors have realized that when operating in this regime, the amplitude of the current through the primary coil strongly depends on the power receiver load and that this results in the conventional approach of a time divided communication and inner control loop being problematic.

Figure 7:
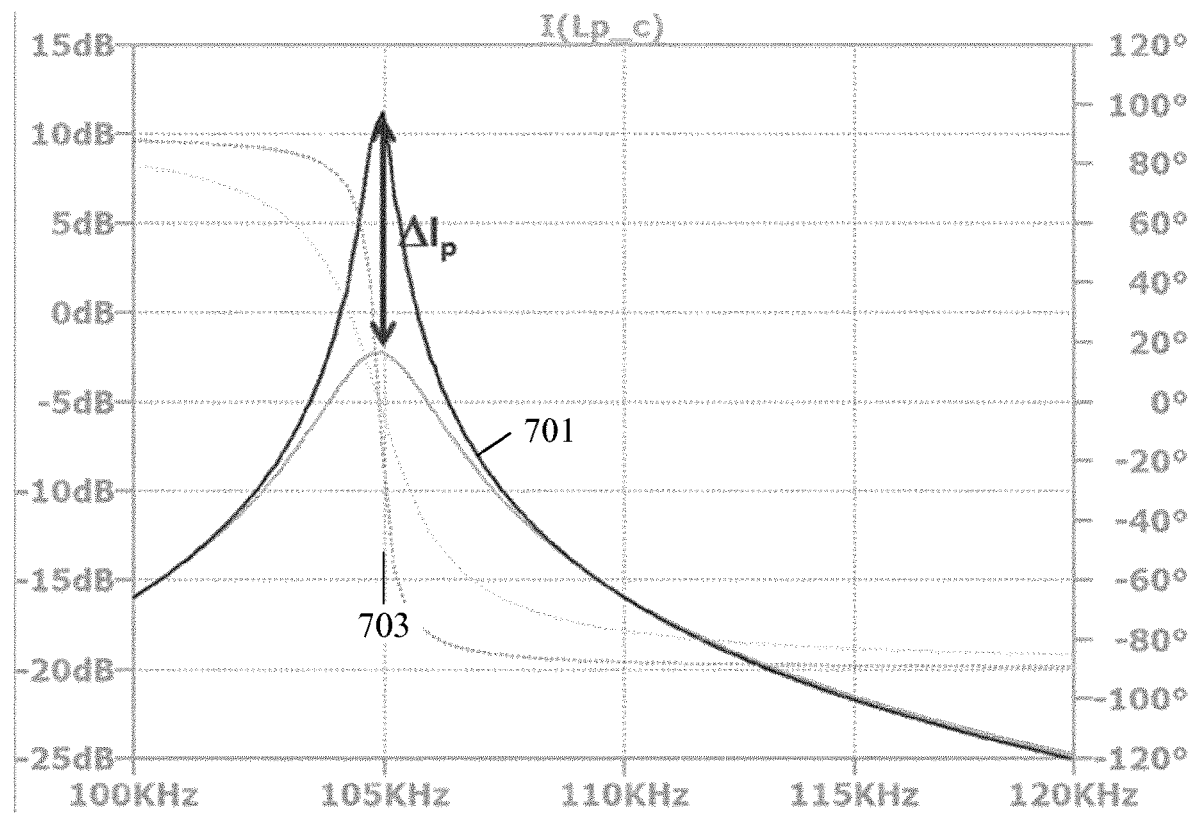
FIG. 7 illustrates an example of transmitter coil currents for different power receiver loads.

FIG. 7 illustrates a simulation result showing the current flowing through the primary coil for a power receiver load of respectively 1 kΩ(curve 701) and 10Ω (curve 703). In the example, the resonance frequencies of the power transmitter and the power receiver are both set at 105 kHz and the coupling between the coils is 0.1.

As shown in the figure, the amplitude of the coil current can drop very significantly (>10 dB) when the power receiver connects its load (e.g. switching from only an internal load of 1 kΩ to also power an external load of 10Ω (e.g. corresponding to a battery)). The large current variations resulting from such load changes can e.g. lead to the following problems:

When the amplitude of the transmitter coil current drops, the power received by the power receiver also drops. If this power drop is too significant, the power received by the power receiver will not be sufficient to maintain proper operation. In this case, the internal microcontroller is reinitialized and the load is disconnected. Typically, this problem occurs when the power receiver connects its load. In this situation, the power transfer phase is always directly aborted.

When the amplitude of the primary current increases, the power received by the power receiver also increases. If this increase is too large, it could saturate or possibly even damage the power receiver.

Thus, when operating in the resonance mode, it is particularly important to control the coil current. However, with the traditional approach, the inner control loop is only active relatively infrequently and with a short duty cycle. Indeed, the time is divided into communication time intervals in which the power transmitter may receive load modulated messages from the power receiver and control intervals in which the inner control loop adapts the operation to provide the desired current. However, if a significant load step occurs during a communication time interval it may be uncompensated for quite a significant time. Thus, the coil current may be very substantially too high or too low for a significant duration thereby potentially resulting in malfunction.

However, in the system of FIG. 5, a different approach is employed which may mitigate and typically prevent such scenarios from occurring. Specifically, in the system of FIG. 5, the power transmitter is arranged to have the (inner) control loop active during communication time intervals, i.e. the power transmitter may during these time intervals be able to both operate the control loop and to receive load modulation.

This is achieved by the power transmitter implementing a control loop response which is arranged to be attenuated for small errors relative to the loop response for larger errors. In particular, the loop response is attenuated for coil current error indications which are within a reduced control range that includes the situation where there is no error (i.e. the measured current is the same as the target current). When the coil current is within this reduced control range, it represents a small difference between the target current and the actual measured current. Accordingly, the loop response is attenuated for small error values compared to when the error is larger. Thus, the control loop will react stronger in response to large errors than it will for small errors.

Indeed, in many embodiments, the loop may not react to errors within the reduced control range (for brevity the coil current error indication being within or outside the reduced control range will be referred to as the (current) error being within or outside the reduced control range. More generally, the inductor current error indication will also be referred to simply as the current error).

Thus, a graduated approach is applied where typically very little or no loop response is applied for small errors whereas a strong response may be applied for large errors. Thus, the loop response to small load variations may be insignificant whereas the response to large errors is very substantial. As a consequence, the loop may compensate for large load variations but not for small load variations.

Accordingly, a loop response is implemented which may allow small current variations resulting from load modulation to remain thereby allowing them to be demodulated by the receiver 503. At the same time, the control loop remains active and is able to compensate for any large current changes such as specifically those resulting from large load steps at the power receiver. Thus, the power transmitter is still able to adapt to load variations and to maintain the coil current within a sufficiently small range.

Accordingly, in contrast to the conventional time division approach of either operating the control loop or receiving load modulation, the approach of the power transmitter of FIG. 5 resolves the conflict between these by using a graduated loop response that allows both functions to be performed concurrently. The approach thus breaks with the conventional understanding that the two operations are incompatible and that only one operation can be performed at any given time.

It will be appreciated that the exact magnitude and type of attenuation and the exact size of the reduced control range will depend on the specific preferences and requirements of the individual embodiment. The parameters may typically be selected to try to minimize the impact of the control loop on current variations due to load modulation while providing a sufficiently strong compensation of larger load variations caused by changes in the load of the power receiver.

In many embodiments, the difference in the loop response for errors within and outside the reduced control range will be implemented by applying a difference in a loop gain of the control loop and/or a difference in the update rate of the control loop. For a sampled control loop, the update rate may reflect the frequency of the samples and/or the frequency of the changes in the output from the control loop (and typically these will be the same). In some embodiments, the update rate may be amended by changing the frequency response of the control loop. This may be done both for continuous and sampled control loops. For example, the loop filter used for values in the reduced control range may have a lower cut-off frequency than for values outside the reduced control range.

For example, the control loop may include a loop filter in the form of an IIR filter given by:

$$\Delta I'_n = \Delta I'_{n-1} + \alpha(\Delta I_n) \cdot \Delta I_n$$

where $\Delta I_n$ is the coil current error indication. In the example, the weighting a of the current coil current error indication is thus dependent on the coil current error indication itself. Specifically, the weighting a is lower for the coil current error indication being within the reduced control range than if outside the reduced control range.

For example, the weighting a may be set to zero for the coil current error indication being within the reduced control range and to a suitable value (such as e.g. 0.1 for many practical applications) for the coil current error indication being outside the reduced control range. As a result, the loop will not update in response to small errors reflecting load modulation variations but will be arranged to quickly adapt to large errors reflecting large load changes of the power receiver.

In the resonance regime, the current through the transmit coil may be adjusted by controlling the duty cycle or the voltage of the drive signal. The voltage amplitude of the drive signal may specifically be adapted by adapting the rail voltage of the DC/AC stage (the inverter switch bridge). Indeed, due to the desire to set the drive frequency to match the resonance frequencies of the power transmitter and the power receiver, this parameter is typically not suitable for adjusting the current. The following examples focus on controlling the coil current by controlling the duty cycle but it will be appreciated that the same principle can be applied to e.g. controlling the voltage amplitude.

In many embodiments, the loop response may specifically be attenuated within the reduced control range by the loop gain being lower for error values within the reduced control range than for values outside it. The gain may for example be determined by considering the relationship between the change in the controlled output and the error value. For example, the response of the first partial loop response LP1 may be lower for error values within the reduced control range than for values outside it.

Specifically, in many embodiments the loop gain may be substantially zero for error values within the reduced control range. Specifically, for values in the reduced control range, the loop response may be such that no changes are made to the parameter being controlled, such as specifically the duty cycle and/or the voltage amplitude of the drive signal.

Figure 8:
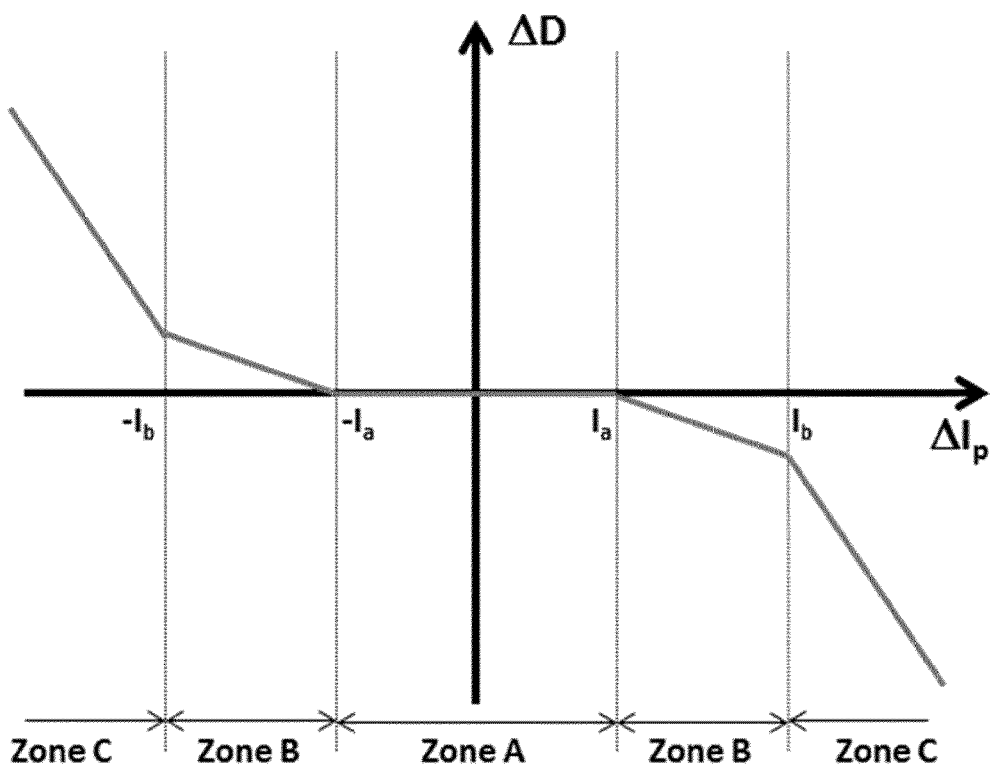
FIG. 8 illustrates an example of a loop response for an inner power control loop for a power transmitter in accordance with some embodiments of the invention.

A specific example of a possible loop response is illustrated in FIG. 8. The figure specifically illustrates a relationship between the duty cycle of the drive signal and the current error. Thus, the figure may be considered to represent the first partial loop response LP1. The second partial loop response LP2 may be considered constant (e.g. corresponding to a constant operation of the current sensor and error unit).

In the example, the possible range of current errors are divided into three zones, referred to zone A, B and C. Zone A corresponds to the reduced control range and is located around a zero current error. For current errors in zone A, i.e. within the reduced control range, the gain of the partial loop, and thus of the full loop, is zero. Thus, for absolute error values $\Delta I = |I_m - I_{target}|$ up to a value of $I_a$ no adjustment is introduced to the duty cycle.

Zone B corresponds to absolute current errors $\Delta I = |I_m - I_{target}|$ in an interval from $I_a$ to $I_b$. For error values in zone B, a constant gain higher than zero is applied, i.e. the change to the duty cycle changes linearly with the current error.

Zone C corresponds to absolute current errors larger than $I_b$. For error values in zone C, a constant gain higher than the one of zone A is applied, i.e. the change to the duty cycle changes linearly with the current error and to a higher degree than for values in zone B.

Thus, in the example, the control loop may operate in a plurality of modes with different loop responses, and in the specific example with different loop gain values. One of the modes is a reduced control mode (errors in zone A) in which the loop response is attenuated with respect to the loop responses in the other modes. In the specific example, the loop response is zero for the reduced control mode, i.e. no control is performed.

In the example, the loop response processor 511 is arranged to switch between the different modes based on the coil current error indication. Specifically, for absolute error values in zone A, the mode corresponding to zero gain is selected; for absolute error values in zone B, a first mode is selected by applying a first gain higher than zero; and absolute error values in zone C, a second mode is selected by applying a second gain which is higher than the first gain.

Thus, in the described example, a progressive gain is applied. In particular, the (absolute) gain is a monotonically increasing function of the absolute current error. Thus, in the example, higher (absolute) current errors results in higher (or unchanged) (absolute) gains being applied, i.e. higher (absolute) current errors results in stronger loop responses and thus a more aggressive loop control and a faster control operation.

This approach may allow a practical and in many scenarios low complexity implementation. It may furthermore provide a very efficient operation where the current performance of the loop can be adapted to the current conditions. Specifically, when the power transfer is well adapted to the current power consumption, no regulation is applied thus allowing the performance to be optimized for detecting load modulation. However, at the same time, the control loop is still active and if the error increases above a given level ($I_n$) the control loop starts adapting the duty cycle to reduce the error. This adaptation may be optimized for relatively small variations and may not be too excessive or fast. Thus, the adaptation may reflect that the difference between the provided and the desired power is still relatively small. This may for example in some embodiments allow load modulation to still be demodulated albeit possibly at a higher error rate. However, if a sudden load step change occurs, such as that caused by the power receiver switching in the load, the current error will exceed $I_b$ and accordingly the loop will operate in the third mode (zone C) with very strong regulation. Accordingly, the fast and large load change may be addressed fast and efficiently (but often at the expense of load modulation being decodable).

Although the above example was described in terms of the (instantaneous) gain value differing between different modes, it will be appreciated that the differentiation may alternatively or additionally be achieved using e.g. an update rate of the loop. For example, when the current error is in zone A, no update of the loop may occur, when the current error is in zone B, the loop (and specifically the duty cycle) may be updated with a relatively low frequency (such as e.g. with an update interval between 1-10 msec); and when the current error is in zone C, the loop may be updated at a high frequency (e.g. the duty cycle may be updated every cycle, e.g. corresponding to an update interval of around 10 μsec). It will be appreciated that the update rate may potentially be different for increasing and decreasing power respectively. For example, in practice it has been found that an update rate in Zone C of 30 μsec for power down operation and 70 μsec for power up operation provides advantageous performance.

Thus, in the above examples, the control loop is arranged such that load modulation can be supported even when the control loop is active. Indeed, the compensation for small load variations is reduced/attenuated such that current variations from load modulation can still be detected while at the same time providing a strong regulation/compensation for large load variations thereby allowing a very fast and effective response to e.g. the large current steps that may occur when operating in the resonant regime.

Thus, in the approach, the control loop is active during communication time intervals in which load modulation may be received from the power receiver. Thus, the loop is active, and can react to (at least some) load/current variations during the entire communication time interval. There is no need to introduce a time division approach where the power transmitter switches between power control and load modulation communication.

Indeed, it is possible for the control loop to continuously operate as described and with the power receiver being able to always transmit messages by load modulation. Thus, the communication time intervals may take up the entire duration (or equivalent a communication time interval can be considered to have a duration of the entire power transfer process/operation).

Figure 9:
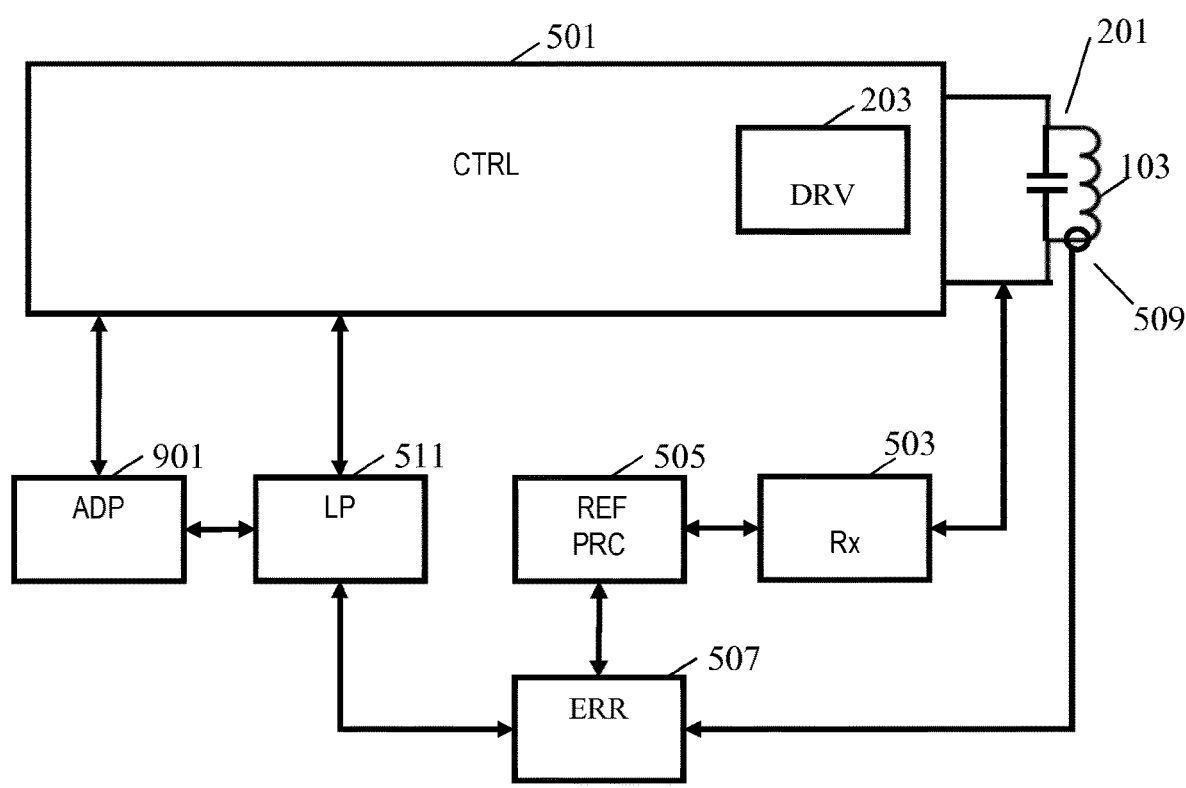
FIG. 9 illustrates an example of elements of a power transmitter in accordance with some embodiments of the invention.

However, in many embodiments, the communication time intervals may only account for part of the duration. Specifically, the communication time intervals may be interspersed by non-communication time intervals. During the communication time intervals, the control loop is active as described, i.e. it implements a reduced control range in which the loop response is attenuated. However, outside the communication time intervals, i.e. during the non-communication time intervals, other loop responses may be applied. Specifically, as illustrated in FIG. 9, the power transmitter 101 may comprise loop adapter 901 which is coupled to the loop response processor 511 and which is arranged to control this such that the control loop has a stronger loop response outside of the communication time intervals, i.e. during the non-communication time intervals, than during communication time intervals.

Specifically, the loop response processor 511 may be adapted to reduce or completely remove the reduced control range during non-communication time intervals. For example, during communication time intervals, a "dead zone" (a gain of zero) is implemented for absolute error values up to $I_a$ (i.e. when in the reduced control range/Zone A). However, during non-communication time intervals, the "dead zone" may only extend up to a value which is (potentially much) smaller than $I_a$. Indeed, in many embodiments, no "dead zone" (i.e. no reduced control range) is employed during non-communication time intervals.

During non-communication time intervals, a stronger loop response may thus be applied for at least some error values than during communication time intervals, and specifically a stronger loop response may in particular be applied for smaller errors than during the communication time intervals. The loop adapter 901 may in many embodiments adapt the loop to have a stronger loop response for at least some error values in the reduced control range, and often for all values. The stronger loop response may specifically be achieved by the gain and/or update rate being higher for at least some error values (of typically the reduced control range) during non-communication time intervals than during communication time intervals.

As a specific example, the loop adapter 901 may control the loop response processor 511 to apply the loop response of FIG. 8 during communication time intervals. Furthermore, the update rate may be 5 msec for zone B and 10 μsec for zone C. However, during non-communication time intervals, the loop response of FIG. 10 may instead be applied. Further, the update rate may for all error values be set to 50 μsec.

Thus, in this example, the loop adapter 901 is arranged to make the reduced control range smaller, to increase the loop gain for many error values, and increase the update rate for many error values when in the non-communication time intervals. All of these factors make the loop response stronger, i.e. result in a larger response/output/adjustment of the duty cycle/amplitude voltage for at least some error values. It will be appreciated that in other embodiments, not all of the described parameters are necessary changed between communication time intervals and non-communication time intervals. For example, in some embodiments, the only parameter being changed is the size of the reduced control range e.g. by the gain of zone B also being used for zone A.

In such embodiments, the loop may accordingly be arranged to operate in different regimes. In a first one, the loop response is attenuated for smaller error values thereby allowing or improving load modulation. However, in a second regime, a stronger loop response is applied and accordingly an improved regulation can be achieved. However, this improved regulation may be achieved at the expense of reduced communication performance and potentially by the power transmitter not being able to demodulate load modulation.

The use of such different regimes may provide particularly efficient operation in many embodiments and applications. For example, the first regime may be operated during communication time intervals in which it is unlikely that load changes or other changes occur (although the loop is still active and can thus react if these do occur and are sufficiently large). However, the regulation may in many scenarios result in the coil current not being fully optimized. For example, no corrections will be made for errors up to $I_a$ in the example of FIG. 8. However, the communication time intervals may be interrupted by non-communication time intervals in which improved regulation occurs. For example, using the loop response of FIG. 10, the control loop may reduce the current error to zero (or close to this). Thus, the two states may provide a synergistic effect with a particularly attractive trade-off between power regulation and communication performance. In practice, the communication time intervals may often be relatively short (say, typically around 5-20 msec) whereas the non-communication time intervals may be substantially longer (say, typically around 100-400 msec). The approach may thus provide very effective power control while still allowing communication during communication time intervals in which power control is still active (although reduced).

It will be appreciated that the power transmitter may use any suitable approach for determining and dividing into communication time intervals and non-communication time intervals.

Indeed, in some embodiments, the determination of communication time intervals may be as time intervals in which it is known, detected or considered likely/possible that the power receiver may transmit a message. However, in other embodiments, the power transmitter may relatively arbitrarily divide e.g. time frames into communication time intervals and non-communication time intervals. Indeed, the communication time intervals and non-communication time intervals may respectively be considered to correspond to the time intervals in which the power transmitter uses respectively the reduced control range loop response and the stronger loop response.

Specifically the controller 501 may comprise functionality for determining the communication time intervals as periodically repeating time intervals. For example, the controller 501 may implement a periodically repeating time frame of 250 msec which is divided into a control time interval (i.e. a non-communication time interval) of, say, 240 msec and a communication time interval of 10 msec. Thus, an improved regulation may be performed for the majority of the time. This may ensure that the actual current through the transmitter coil matches the target value closely at the end of the control time interval. However, for part of the time frame, the regulation is modified to allow load modulation to be detected while at the same time still providing regulation that can compensate for larger load variations.

Such an approach may provide a low complexity approach and may for example be suitable in applications in which messages may be transmitted at any time but where it is not critical that all messages are correctly received. It will be appreciated that the duration of respectively communication time intervals and non-communication time intervals can be adapted to the individual embodiment to reflect the preferred trade-off between regulation performance and communication performance (and specifically the communication error rate).

In many embodiments, the power transmitter may be arranged to determine the communication time intervals as time intervals in which it is considered likely that the power receiver will or may transmit load modulation messages. This may for example be based on a Technical Specification that both the power transmitter and power receiver must comply with and which includes restrictions on the timing of communication of messages.

In some embodiments, the power transmitter may be arranged to detect a message being transmitted from the power receiver and to determine a communication time interval in response to this detection. Specifically, the controller 501 may be arranged to determine a start of a communication time interval in response to the receiver detecting a predetermined preamble pattern for a message from the power receiver.

Thus, in some embodiments, the power receiver may initialize a message, or a series of messages, by sending a preamble which has a predetermined pattern. Such a pattern typically includes a number of transitions and stretches over a plurality of data bits. Accordingly, such preambles are typically detectable with substantially higher probability than the demodulation of individual bits. Accordingly, the message receiver 503 may often be able to detect the predetermined preamble pattern even though the stronger loop response of the non-communication time intervals is being used. Therefore, the power receiver may operate in a non-communication time interval (i.e. with a stronger loop response) until the power transmitter detects the presence of the predetermined preamble pattern. When this is detected, the power transmitter may switch to be in a communication time interval in which the reduced control range is applied in order to allow reliable demodulation of the load modulated message from the power receiver. The power transmitter may then switch back to the non-communication time interval e.g. after a predetermined time period or when the full message has been received.

In some embodiments, the loop response processor 511 may be arranged to employ an asymmetric loop response during communication time intervals and a symmetric loop response outside of communication time intervals, i.e. during non-communication time intervals.

In a symmetric loop response, the loop response as a function of the coil current error may be symmetric around a value of zero for the coil current error. Specifically, the absolute value of the loop response (e.g. loop gain) may be a symmetric function of the coil current error with a symmetry corresponding to the coil current error being zero. Examples of symmetric loop responses are illustrated in e.g. FIGS. 8 and 10.

Figure 11:
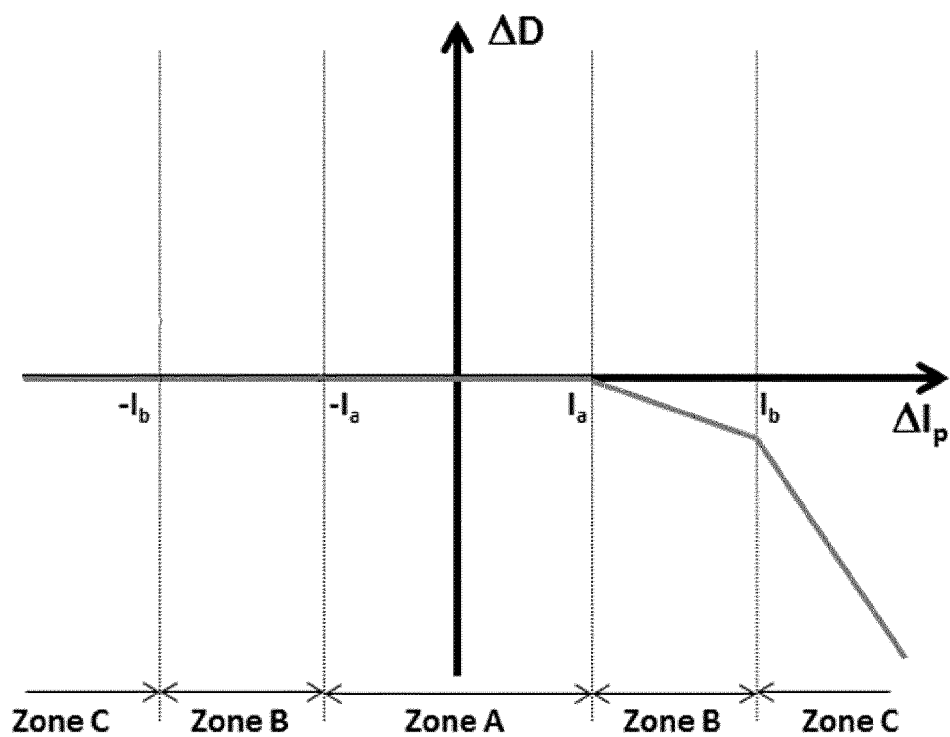
FIG. 11 illustrates an example of a loop response for an inner power control loop for a power transmitter in accordance with some embodiments of the invention.

An asymmetric loop response may be a loop response that is not symmetric. Specifically, for an asymmetric loop, the loop response as a function of the coil current error is not symmetric around a value of zero for the coil current error. Specifically, the absolute value of the loop response (e.g.

loop gain) is not a symmetric function of the coil current error with a symmetry corresponding to the coil current error being zero. Examples of an asymmetric loop response is illustrated in e.g. FIG. 11.

Figure 10:
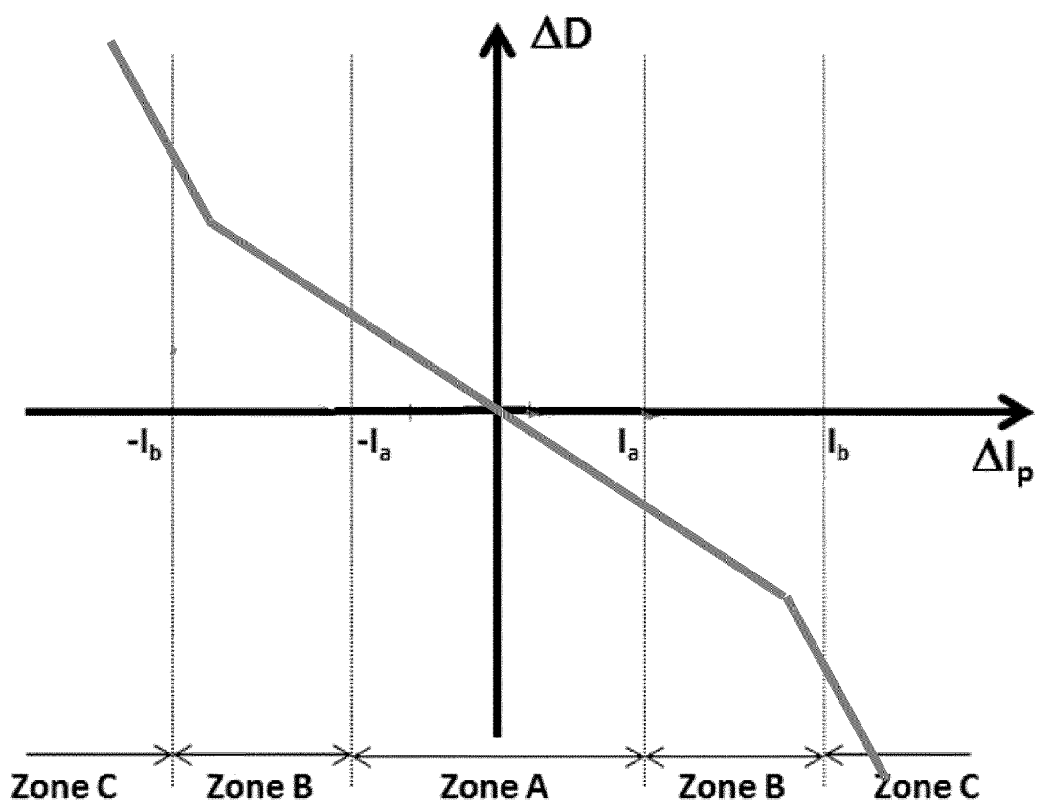
FIG. 10 illustrates an example of a loop response for an inner power control loop for a power transmitter in accordance with some embodiments of the invention.

In the symmetric responses as of e.g. FIGS. 8 and 10, the absolute loop response is the same for coil current errors with the same absolute value but opposite signs. In the asymmetric response of e.g. FIG. 11, the absolute loop response is different for at least some coil current errors with the same absolute value but opposite signs.

An asymmetric loop may have different loop responses/gains for errors that indicate that the measured current is higher than the target value than for errors that indicate that the measured current is lower than the target value. A symmetric loop may have same loop gains for errors that indicate that the measured current is higher than the target value and for errors that indicate that the measured current is lower than the target value.

Specifically, in an asymmetric loop response, responses to errors that indicate that the measured current is higher than the target value may be higher than for errors that indicate that the measured current is lower than the target value. Indeed, in the latter case, there may be no response, i.e. the asymmetric response may be arranged to not allow any increase of the current through the transmitter coil.

For example, the symmetric loop response may be that of FIG. 10 and this may be employed during non-communication time intervals. However, during the communication time intervals, the loop response of FIG. 11 may be used.

Such approaches may provide a safety mechanism in some scenarios. For example, similarly to Qi, effective power control may be performed during relatively short intervals in which communication is not supported. However, in contrast to conventional Qi, the control loop remains active during the communication time intervals and is arranged such that it can adapt if a load step occurs resulting in an excessive current. Thus, although full power control may not be employed during the communication time intervals, the control loop is still active to provide a safety function that ensures that the current does not become excessive.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for inductively transferring power to a power receiver, the power transmitter comprising:
   a resonance circuit comprising a transmitter coil for generating a power transfer signal for wirelessly transferring power to the power receiver;
   a driver for generating a drive signal for the resonance circuit, the drive signal having a drive frequency;
   an error unit arranged to determine a coil current error indication being indicative of a difference between a measured current for the transmitter coil and a target current for the transmitter coil;
   a receiver for receiving messages load modulated onto the power transfer signal by the power receiver during communication time intervals; and
   a control loop arranged to control the current through the transmitter coil in response to the coil current error indication, the control loop being arranged to be active during communication time intervals; and
   wherein, at least during communication time intervals, a loop response of the control loop is attenuated for coil current error indications in a reduced control range relative to coil current error indications outside the reduced control range, the reduced control range comprising a coil current error indication value corresponding to zero coil current error.

2. The power transmitter of claim 1 wherein at least one of a loop gain and an update rate of the control loop is substantially zero for coil current error indications in the reduced control range.

3. The power transmitter of claim 1 comprising an adapter arranged control the control loop to have a stronger loop response outside of the communication time intervals than during communication time intervals.

4. The power transmitter of claim 3 wherein the adapter is arranged to apply at least one of a higher loop gain and a higher loop update rate for at least some values of the coil current error indication outside of the communication time intervals than during communication time intervals.

5. The power transmitter of claim 3 further comprising a communication timer arranged to determine a start of a communication time interval in response to the receiver detecting a predetermined preamble pattern for a message from the power receiver.

6. The power transmitter of claim 3 further comprising a communication timer arranged to determine at least some communication time intervals as periodically repeating time intervals.

7. The power transmitter of claim 3 wherein the adapter is arranged to decrease a size of the reduced control range outside of the communication time intervals.

8. The power transmitter of claim 3 wherein the adapter is arranged to control the control loop to employ an asymmetric loop response during communication time intervals and a symmetric loop response outside of the communication time intervals, a symmetric loop response providing the same absolute loop response for coil current errors with the same absolute value and opposite signs, and an asymmetric loop response for at least some coil current errors providing different absolute loop responses for coil current errors with the same absolute value and opposite signs.

9. The power transmitter of claim 8 wherein the asymmetric response is arranged to not allow an increase of the current through the transmitter coil.

10. The power transmitter of claim 1 wherein at least one of an absolute feedback gain and an update rate of the control loop is a monotonically increasing function of an absolute value of the coil current error indication.

11. The power transmitter of claim 1 wherein the control loop is arranged to support a plurality of modes having different loop responses, the modes including a reduced control mode in which the loop response is attenuated with respect to the loop response for other modes, and further comprising an adapter arranged to switch the control loop between the modes in response to the coil current error indication, the adapter being arranged to switch to the reduced mode in response to a determination that the coil current error indication is within the reduced control range.

12. The power transmitter of claim 1 wherein the control loop is arranged to determine the target current in response to power control messages received from the power receiver.

13. The power transmitter of claim 1 wherein the control loop is arranged to control the current by controlling at least one of a duty cycle, a drive frequency and a voltage amplitude of the drive signal.

14. A wireless power transfer system comprising a power transmitter according to claim 1 and a power receiver.

15. A method of operation for a power transmitter inductively transferring power to a power receiver, the power transmitter comprising a resonance circuit comprising a transmitter coil for generating a power transfer signal for wirelessly transferring power to the power receiver; the method comprising:
generating a drive signal for the resonance circuit, the drive signal having a drive frequency;
determining a coil current error indication being indicative of a difference between a measured current for the transmitter coil and a target current for the transmitter coil;
receiving messages load modulated onto the power transfer signal by the power receiver during communication time intervals; and
a control loop controlling the current through the transmitter coil in response to the coil current error indication, the control loop being active during communication time intervals;
wherein, at least during communication time intervals, a loop response of the control loop is attenuated for coil current error indications in a reduced control range relative to coil current error indications outside the reduced control range, the reduced control range comprising a coil current error indication value corresponding to zero coil current error.

* * * * *